Feb. 13, 1940.　　　　S. H. MOCK　　　　2,190,105
COCONUT GRATER
Filed Sept. 29, 1938

Stanley H. Mock,
INVENTOR

BY
ATTORNEY

WITNESS

Patented Feb. 13, 1940

2,190,105

UNITED STATES PATENT OFFICE 2,190,105

COCONUT GRATER

Stanley Hon Mock, Honolulu, Territory of Hawaii

Application September 29, 1938, Serial No. 232,398

1 Claim. (Cl. 146—6)

This invention relates to graters, and its general object is to provide a rotary grater that is primarily designed for grating or shredding coconut meat before it is removed from the shell, in that my grater includes a motor operated grating tool having a relatively long shank, with toothed grating blades fixed to the outer end portion of the shank for disposal within an opening in the nut, and the nut is held and moved relative to the blades for the latter to act upon the meat, with the result it will be seen that the entire meat contents of the shell can be removed from the wall thereof in a grated condition, with minimum effort on the part of the user.

A further object is to provide a coconut grater that includes a tool in which the blades thereof are fixed against any possibility of casual displacement or removal and in a manner to minimize the blades from becoming bent or distorted.

Another object is to provide a coconut grater that includes a motor operated tool which is detachable from its motor driven means, in order to facilitate cleaning the same.

A still further object is to provide a coconut grater, that is simple in construction, inexpensive to manufacture and extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing, wherein like characters denote like or corresponding parts throughout the several views, and in which.

Figure 1:
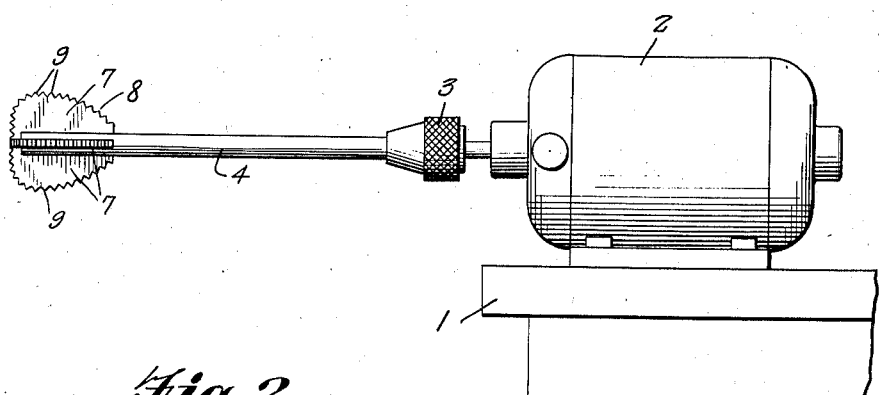
Figure 1 is a side elevation of the grater which forms the subject matter of the present invention.
Figure 2:
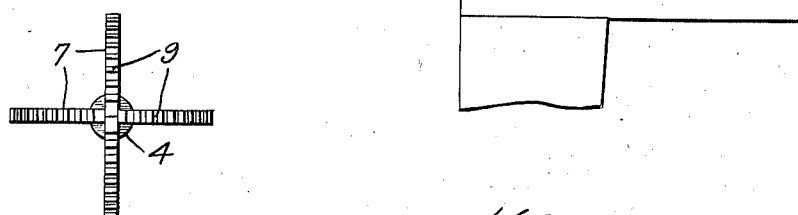
Figure 2 is a front view of the grating tool.

Referring to the drawing in detail, the reference numeral 1 indicates a supporting structure which may be a table as shown, and fixed thereto is an electric motor 2 having secured to the armature shaft thereof a chuck 3.

Figure 4:
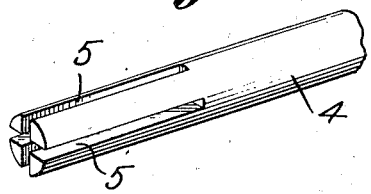
Figure 4 is a fragmentary perspective view illustrating the forward portion of the shank, before the blades are fixed thereto.

The motor and chuck may be of any well known construction as my invention lies essentially in the tool which includes an elongated shank 4 having one end designed to be detachably secured to the chuck, and extending longitudinally from the opposite or outer end of the shank for a portion of its length is a pair of slots 5, disposed transversely through the shank to intersec each other along its longitudinal axis as clearly shown in Figure 4.

Figure 3:
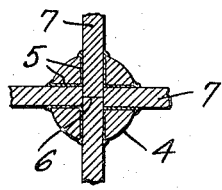
Figure 3 is a fragmentary vertical sectional view illustrating the manner of securing the blades to the shank of the tool.

Seated and welded or otherwise fixed within the slots 5 are the straight inner edge portions 6 of flat substantially semi-circular blades 7, to radiate from the shank in right angled disposed pairs, and the blades of one pair are shown as being of a greater width than those of the other pair, so that the confronting faces of the wide blades are disposed in abutting relation, while the confronting faces of the other blades abut the lateral faces of the wide blades as clearly shown in Figure 3. The blades are of greater length than that of the slots and likewise have straight front and rear ends, with their front ends extending forwardly beyond the shank, while their rear ends abut the rear ends of the slots, as shown in Figure 1.

Figure 5:
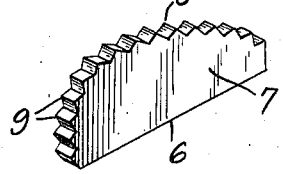
Figure 5 is a perspective view of one of the blades.

The blades have their outer edges, or in other words the edges thereof that are opposed to their fixed edges curved inwardly as at 8 from the front to the rear ends thereof, so that the blades decrease in width accordingly, as will be apparent upon inspection of Figure 5, and the front ends and curved edges of the blades are notched throughout the length thereof to provide teeth 9.

From the above description and disclosure in the drawing, it is believed that the manner of using my grater will be obvious, but it might be mentioned that an opening of a size to admit the blades, is made in one end of the nut, thence the nut is applied to the blades for the disposal of the latter interiorly thereof to act upon the meat, and then the nut is moved relative to the blades until the entire meat contents is grated from the wall of the shell.

It is thought from the foregoing description that the advantages and novel features of the invention will be readily apparent.

It is to be understood that changes may be made in the construction and in the combination and arrangement of the several parts, provided that such changes fall within the scope of the appended claim.

I claim:

A coconut grater comprising motor operated means, a grating tool including a shank having one end portion detachably secured to the motor operated means for rotating the tool, said shank having a pair of slots extending longitudinally thereof from its outer end for a portion of its length and transversely therethrough to intersect each other along the longitudinal axis of the shank, flat substantially semi-circular blades having straight inner edge portions seated and fixed within the slots to radiate from the shank in right angled disposed pairs and having substantially straight front and rear ends with the front ends extending forwardly beyond the shank and the rear ends abutting the rear ends of the slots, said blades having their edges opposed to the fixed edges curved inwardly from the front to the rear ends of the blades so that the forward portions of the latter are of greater width than the rearward portions, and the front ends and curved edges of the blades being notched throughout the length thereof to provide teeth.

STANLEY HON MOCK.